United States Patent
Sato

(10) Patent No.: US 7,814,793 B2
(45) Date of Patent: Oct. 19, 2010

(54) GYRO SENSOR MODULE AND ANGULAR VELOCITY DETECTION METHOD

(75) Inventor: Kenji Sato, Matsumoto (JP)

(73) Assignee: Epson Toyocom Corporation (JP)

( * ) Notice: Subject to any disclaimer, the term of this patent is extended or adjusted under 35 U.S.C. 154(b) by 370 days.

(21) Appl. No.: 12/025,107

(22) Filed: Feb. 4, 2008

(65) Prior Publication Data

US 2008/0184770 A1    Aug. 7, 2008

(30) Foreign Application Priority Data

Feb. 5, 2007    (JP) .............................. 2007-025138

(51) Int. Cl.
    *G01C 19/00*    (2006.01)
    *G01P 21/00*    (2006.01)
    *G01P 3/04*    (2006.01)

(52) U.S. Cl. ....................... 73/504.12; 73/510; 73/1.37; 702/104

(58) Field of Classification Search ................. 73/1.37, 73/1.38, 504.12, 504.16, 504.04, 510, 511; 702/87, 88, 104
See application file for complete search history.

(56) References Cited

U.S. PATENT DOCUMENTS

| | | | | |
|---|---|---|---|---|
| 6,925,401 | B2 * | 8/2005 | Kameya | .................... 702/87 |
| 7,644,604 | B2 * | 1/2010 | Hotelling et al. | ............. 73/1.77 |
| 7,677,076 | B2 * | 3/2010 | Takeno | ....................... 73/1.37 |
| 2008/0314145 | A1 * | 12/2008 | Sato | ....................... 73/504.16 |

FOREIGN PATENT DOCUMENTS

| | | |
|---|---|---|
| JP | 2001-153658 | 6/2001 |
| JP | 2002-213959 | 7/2002 |
| JP | 2004-286529 | 10/2004 |

\* cited by examiner

*Primary Examiner*—Helen C. Kwok
(74) *Attorney, Agent, or Firm*—Harness, Dickey & Pierce, P.L.C.

(57) ABSTRACT

A mobile navigation system gyro module comprises: first and second gyro sensors outputting angular velocities $\omega 1$, $\omega 2$ around first and second axes intersecting at an acute angle $\theta_{12}$; a sign determination circuit determining a sign of $\omega 1$; a correction circuit correcting the first and second gyro sensor outputs; and a computation circuit computing $\omega' = \sqrt{(\omega 1'^2 + SA^2)}$ and $SA = (\omega 2' - \omega 1' \cos \theta_{12})/\sin \theta_{12}$ using angular velocities $\omega 1'$, $\omega 2'$ from the correction circuit, and outputting angular velocity $\omega$ by multiplying $\omega'$ by the sign of $\omega 1$, wherein the correction circuit includes: first and second offset adjustment circuits outputting $\omega 1''$ and $\omega 2''$ by respectively subtracting from $\omega 1$ and $\omega 2$, corrections B1 and B2 corresponding to the first and second gyro sensor outputs when the mobile unit stops; and the angular velocity $\omega$ is around an axis coplanar with and between the first and second axes.

6 Claims, 6 Drawing Sheets

GYRO SENSOR MODULE AND ANGULAR VELOCITY DETECTION METHOD

BACKGROUND

1. Technical Field

The present invention relates to a gyro sensor module for detecting an angular velocity to know an azimuth and an angular velocity detection method.

2. Related Art

A gyro sensor is used in a navigation system mounted in a vehicle or the like. The angular velocity to be detected by the gyro sensor when the vehicle makes a turn is used to know the azimuth of the vehicle. In order to detect the angular velocity accurately, the angular velocity detection axis and the detected axis of the gyro sensor must be matched. The detected axis to be used to know the azimuth is an axis perpendicular to the horizontal ground surface. A match between the detection axis and the detected axis increases the detection sensitivity, thereby increasing the signal-to-noise ratio to increase the detection accuracy. On the other hand, an orthogonality between the detection axis and the detected axis reduces the detection sensitivity, thereby reducing the signal-to-noise ratio to reduce the detection accuracy.

A gyro sensor mounting angle adjustment device is known that matches the detection axis and the detected axis by detecting the inclination angle of a vehicle and mechanically adjusting the mounting angle of a gyro sensor relative to the vehicle so that the mounting surface of the gyro sensor is in parallel with the horizontal ground surface (see JP-A-2001-153658, pp. 3 to 5, FIGS. 1 and 2).

Also, a navigation system is known that obtains the angular velocity around the vertical axis from the square sum average of an output of a first gyro sensor and an output of a second gyro sensor having a detection axis orthogonal to the detection axis of the first gyro sensor without having to determine the inclination angle of the road surface and those of the mounted gyro sensors. Further, a navigation system is known that computes a correction factor from an error outputted from a control circuit and a vehicle speed signal so as to correct the angular velocity around the vertical axis (see JP-A-2002-213959, pp. 8, paragraphs [0067] and [0068]).

Furthermore, a multi-axis gyro sensor is known that determines whether or not a failure has occurred therein according to outputs of a first gyro sensor and a second gyro sensor (see JP-A-2004-286529 (ABSTRACT)).

In order to mechanically adjust the mounting angle of a gyro sensor, the gyro sensor must include an adjustment component. Dedicated space is needed to substantially change the mounting angle. Therefore, the movable range of the mounting angle of the detection axis is limited. Also, if a mechanical adjustment is made such as when the angle of the detection axis is rapidly changed on an upward or downward slope, or the like, it takes a time to match the detection axis and the detected axis. This makes it difficult to increase the detection accuracy. For these reasons, as disclosed in JP-A-2002-213959, a related art technology has been proposed that obtains the angular velocity around the vertical axis from the square sum average of an output of a first gyro sensor and an output of a second gyro sensor having a detection axis orthogonal to the detection axis of the first gyro sensor without having to determine the inclination angle of a road surface and further increases the detection accuracy using a so-called correction factor. However, the inventors have found that a detection error occurs due to the first and second gyro sensors both having undergone no offset process.

SUMMARY

An advantage of the invention is to provide a gyro sensor module and an angular velocity detection method that each increases the detection accuracy regardless of to what extent the mounting angle of the detection axis changes.

According to a first aspect of the invention, a gyro sensor module built into a navigation system mounted into a mobile unit includes: a first gyro sensor detecting and outputting a first angular velocity $\omega1$ around a first detection axis; a sign determination circuit for determining a sign of the first angular velocity $\omega1$; a second gyro sensor detecting and outputting a second angular velocity $\omega2$ around a second detection axis intersecting the first detection axis at an acute angle $\theta_{12}$; a sensor output correction circuit for correcting outputs of the first and second gyro sensors; and a computation circuit for computing $\omega'$ by equations $\omega'=\sqrt{(\omega1'^2+SA^2)}$ and $SA=(\omega2'-\omega1'\cos\theta_{12})/\sin\theta_{12}$ using a first angular velocity $\omega1'$ and a second angular velocity $\omega2'$ obtained by a correction performed by the sensor output correction circuit, and outputting an angular velocity $\omega$ obtained by multiplying the $\omega'$ by the sign of the first angular velocity $\omega1$ obtained by the sign determination circuit. The sensor output correction circuit includes: a first offset adjustment circuit for outputting a value $\omega1''$ obtained by subtracting from the $\omega1$ a correction value B1 corresponding to an output value of the first gyro sensor at a time when the mobile unit in which the gyro sensor module is disposed is stopping; and a second offset adjustment circuit for outputting a value $\omega2''$ obtained by subtracting from the $\omega2$ a correction value B2 corresponding to an output value of the second gyro sensor at a time when the mobile unit in which the gyro sensor module is disposed is stopping. The angular velocity $\omega$ is an angular velocity around an axis located in a plane including the first and second detection axes and in a range between the first and second detection axes.

According to the first aspect of the invention, the first and second angular velocities $\omega1$ and $\omega2$ are converted into the first and second angular velocities $\omega1''$ and $\omega2''$ by the first and second offset adjustment circuits included in the sensor output correction circuit, by subtracting the output value B1 of the first gyro sensor and the output value B2 of the second gyro sensor at a time when the mobile unit is stopping from the first and second angular velocities $\omega1$ and $\omega2$. Thus, the more accurate first and second angular velocities $\omega1''$ and $\omega2''$ at a time when the vehicle 102 is moving are obtained.

Also, the angular velocity $\omega$ around the detected axis perpendicular to the horizontal ground surface is detected by synthesizing the angular velocities measured on the two detection axes regardless of to what extent the mounting angle of each detection axis changes or to what extent the angle that each detection axis forms with the horizontal ground surface changes.

The angle formed by the first and second detection axes is an acute angle, and the angular velocity $\omega$ is detected in the acute angle. Therefore, the angle formed by the detection axes and the detected axis is reduced. This allows a gyro sensor module having a good detection accuracy to be obtained.

The acute angle is preferably 20° to 60°, more preferably 30° to 50°. Variations in inclination of a vehicle or the like are on the order of 40° at maximum even if upward slopes and downward slopes of a road are considered. If the acute angle is less than 20°, the detected axis easily gets out of the range between the first and second detection axes, thereby making it difficult to obtain a high detection accuracy. Also, variations in inclination of a vehicle or the like on an ordinary road are rarely 60° or more.

The gyro sensor module according to the first aspect of the invention preferably further includes: a vehicle position measurement circuit for outputting an error $\Delta\theta$ between a traveling azimuth obtained by integrating the angular velocity $\omega$ outputted from the computation circuit and a traveling azimuth of the mobile unit computed by the navigation system; and an adjustment factor computation circuit for computing and outputting sensitivity adjustment signals A1 and A2 from the error $\Delta\theta$, the angular velocity $\omega$ outputted from the computation circuit, and a vehicle speed pulse outputted from the vehicle. The sensor output correction circuit preferably includes: a first sensitivity adjustment circuit for outputting an value $\omega1'$ obtained by multiplying the $\omega1''$ outputted from the first offset adjustment circuit by the sensitivity adjustment signal A1; and a second sensitivity adjustment circuit for outputting an value $\omega2'$ obtained by multiplying the $\omega2''$ outputted from the second offset adjustment circuit by the sensitivity adjustment signal A2.

According to the first aspect of the invention, the sensitivity adjustment signals A1 and A2 are computed from the error $\Delta\theta$ between the traveling azimuth obtained by integrating the angular velocity $\omega$ and the traveling azimuth of the mobile unit computed by the navigation system, the angular velocity $\omega$, and the vehicle speed pulse. Then, sensitivity adjustments are performed by multiplying the $\omega1''$ and $\omega2''$ by the sensitivity adjustment signals A1 and A2, and the $\omega1'$ and the $\omega2'$ are outputted from the sensor output correction circuit. Thus, a gyro sensor module that detects the angular velocity $\omega'$ more accurately is obtained.

According to a second aspect of the invention, a method for detecting an angular velocity using a gyro sensor module built into a navigation system mounted into a mobile unit includes: detecting a first angular velocity $\omega1$ around a first detection axis; determining a sign of the first angular velocity $\omega1$; detecting a second angular velocity $\omega2$ around a second detection axis intersecting the first detection axis at an acute angle $\theta_{12}$; performing sensor output corrections including a first offset adjustment in which a correction value B1 corresponding to an output value of the first gyro sensor at a time when the mobile unit in which the gyro sensor module is disposed is stopping is subtracted from the $\omega1$ and a second offset adjustment in which a correction value B2 corresponding to an output value of the second gyro sensor at a time when the mobile unit in which the gyro sensor module is disposed is stopping is subtracted from the $\omega2$; and computing an angular velocity $\omega$ by computing $\omega'$ by equations $\omega'=\sqrt{(\omega1'^2+SA^2)}$ and $SA=(\omega2'-\omega1'\cos\theta_{12})/\sin\theta_{12}$ using a first angular velocity $\omega1'$ and a second angular velocity $\omega2'$ obtained in the sensor output corrections and then multiplying the $\omega'$ by the sign of the first angular velocity $\omega1$. The angular velocity $\omega$ is an angular velocity around an axis located in a plane including the first and second detection axes and in a range between the first and second detection axes.

According to the second aspect of the invention, the first and second angular velocities $\omega1$ and $\omega2$ are offset-adjusted by subtracting, from the first and second angular velocities $\omega1$ and $\omega2$, the output value B1 of the first gyro sensor and the output value B2 of the second gyro sensor at a time when the mobile unit is stopping. Thus, the more accurate first and second angular velocities $\omega1'$ and $\omega2'$ at a time when the mobile unit is moving are obtained.

Also, the angular velocity $\omega$ around the detected axis perpendicular to the horizontal ground surface is detected by synthesizing the angular velocities measured on the two detection axes regardless of to what extent the mounting angle of each detection axis changes or to what extent the angle that each detection axis forms with the horizontal ground surface changes.

The angle formed by the first and second detection axes is an acute angle, and the angular velocity $\omega$ is detected in the acute angle. This reduces the angle formed by the detection axes and the detected axis, thereby increasing the detection accuracy.

The method for detecting an angular velocity according to the second aspect of the invention preferably further includes: computing an error $\Delta\theta$ between a traveling azimuth obtained by integrating the angular velocity $\omega$ and a traveling azimuth of the mobile unit computed by the navigation system; and computing sensitivity adjustment signals A1 and A2 from the error $\Delta\theta$ and the angular velocity $\omega$. In the sensor output corrections performing step, a first sensitivity adjustment in which an value $\omega1'$ is computed by multiplying a value $\omega1''$ after the first offset adjustment by the sensitivity adjustment signal A1 and a second sensitivity adjustment in which an value $\omega2'$ is computed by multiplying a value $\omega2''$ after the second offset adjustment by the sensitivity adjustment signal A2 are preferably performed.

According to the second aspect of the invention, besides the offset adjustments, the sensitivity adjustments are performed by multiplying the $\omega1''$ and $\omega2''$ by the sensitivity adjustment signals A1 and A2 computed from the error $\Delta\theta$ between the traveling azimuth obtained by integrating the angular velocity $\omega$ and the traveling azimuth of the mobile unit computed by the navigation system, the angular velocity $\omega$, and the vehicle speed pulse. Thus, the angular velocity $\omega$ is detected more accurately.

In the method for detecting an angular velocity according to the second aspect of the invention, the sensor output corrections performing step is preferably performed by a sensor output correction circuit.

According to the second aspect of the invention, the sensor output corrections are performed by a sensor output correction circuit. Therefore, the gyro sensor module is able to include the sensor output correction circuit.

In the method for detecting an angular velocity according to the second aspect of the invention, one or more of the sensor output corrections, the angular velocity $\omega$ computation, the error $\Delta\theta$ computation, and the sensitivity adjustment signals A1 and A2 computations are preferably performed using software.

According to the second aspect of the invention, one or more of the sensor output corrections, the angular velocity $\omega$ computation, the error $\Delta\theta$ computation, and the sensitivity adjustment signals A1 and A2 computations are performed using software. Therefore, such processing is performed by a central processing unit (CPU) of the navigation system including the gyro sensor module. This allows downsizing of the gyro sensor module.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the accompanying drawings.

First Embodiment

Figure 1:
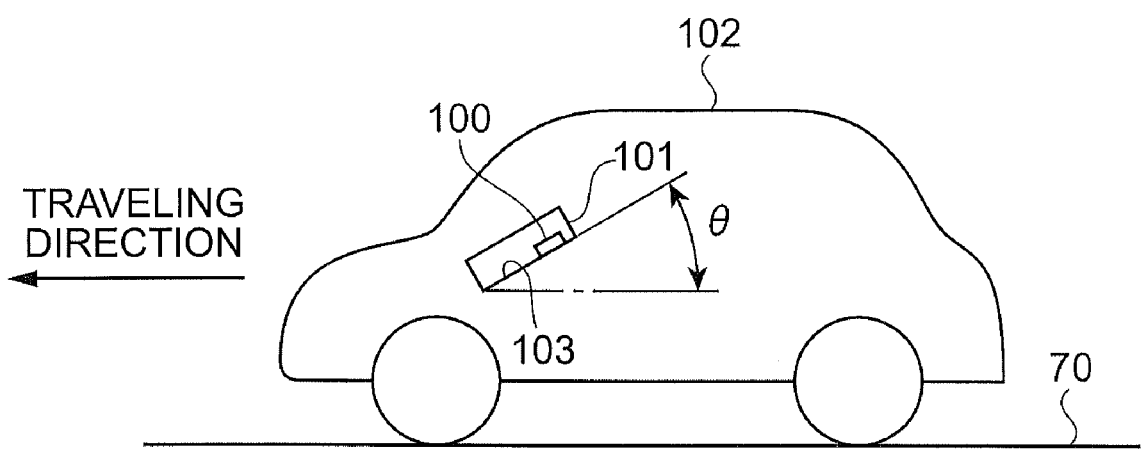
FIG. 1 is a schematic drawing showing a state in which a navigation system including a gyro sensor module according to a first embodiment of the invention is mounted into a vehicle that is a mobile unit.

FIG. 1 is a schematic drawing showing a state in which a navigation system 101 including a gyro sensor module 100 according to a first embodiment of the invention is mounted in a vehicle 102 that is a mobile unit. In FIG. 1, the navigation system 101 is mounted in the front part of the vehicle 102. The vehicle 102 moves toward the left side of the paper surface. The navigation system 101 is mounted at an angle θ formed by a bottom thereof 103 and a horizontal ground surface 70. The gyro sensor module 100 is mounted on the bottom 103 of the navigation system 101.

Figure 2:
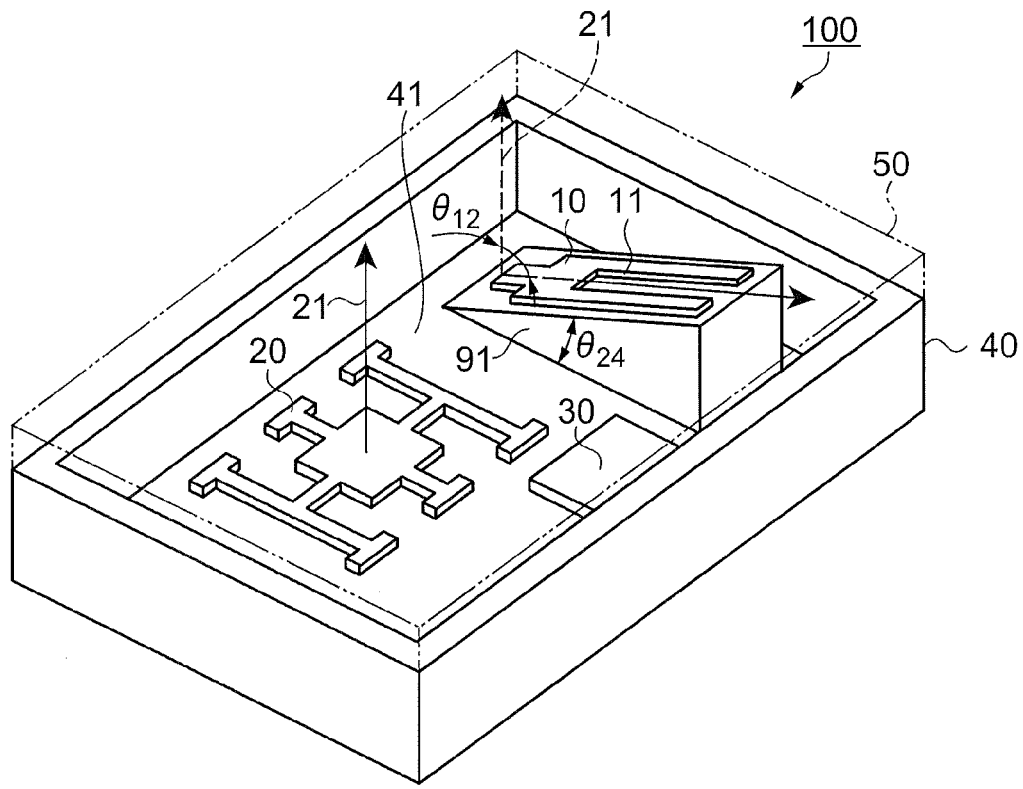
FIG. 2 is a schematic perspective showing the gyro sensor module.

FIG. 2 is a schematic perspective view showing the gyro sensor module 100 according to this embodiment. In FIG. 2, the gyro sensor module 100 includes a first gyro sensor 10, a second gyro sensor 20, a circuit 30, a box-shaped package 40, and a lid 50. The first gyro sensor 10, the second gyro sensor 20, and the circuit 30 are disposed on a rectangular bottom 41 of the package 40.

The first gyro sensor 10 is a tuning fork-shaped gyro sensor having a first detection axis 11 and is disposed on a slope of a base 91 provided on the bottom 41. The slope is at an angle $\theta_{24}$ with the bottom 41. Therefore, the first detection axis 11 is at the angle $\theta_{24}$ with the bottom 41.

The second gyro sensor 41 is a double T-shaped gyro sensor that is a combination of two T-shaped vibrators. The second gyro sensor 20 is disposed so that a second detection axis 21 thereof is orthogonal to the bottom 41.

Since the first detection axis 11 is at the angle $\theta_{24}$ with the bottom 41, the angle formed by the first and second detection axes 11 and 22 is an acute angle $\theta_{12}$ (the direction of the second detection axis 21 is shown on an extension of the first detection axis 11 using a dotted line in the drawing).

Figure 3:
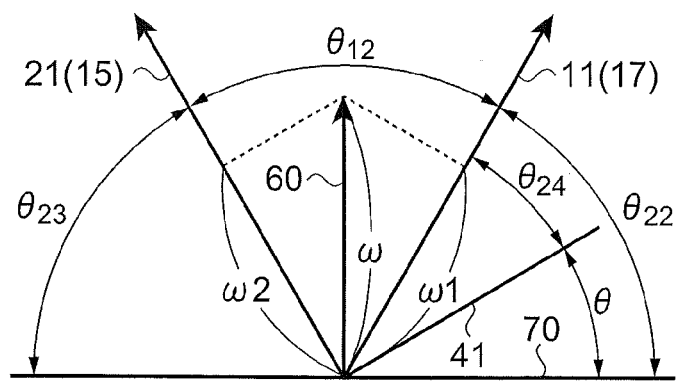
FIG. 3 is a diagram showing a positional relation among first and second detection axes, a detected axis, and a horizontal ground surface.

FIG. 3 is a diagram showing a positional relation among the first and second detection axes 11 and 21, a detected axis 60, and the horizontal ground surface 70. In FIG. 3, the horizontal ground surface 70 is orthogonal to the paper surface, and the detected axis 60 around which an angular velocity ω is to be detected is directed perpendicular to the horizontal ground surface 70. The navigation system 101 including the gyro sensor module 100 shown in FIG. 1 is mounted in the vehicle so that a plane including the first and second detection axes 11 and 21 is approximately perpendicular to the horizontal ground surface 70.

The first detection axis 11 and the horizontal ground surface 70, and the second detection axis 21 and the horizontal ground surface 70 form an angle $\theta_{22}$ and an angle $\theta_{23}$, respectively. If the bottom 41 of the gyro sensor module 100 is parallel with the bottom 103 of the navigation system 101 shown in FIG. 1, the angle $\theta_{22}$ is equal to the angle θ formed by the bottom 103 and the horizontal ground surface 70 plus an angle $\theta_{24}$.

In order to detect the azimuth of the vehicle accurately, the navigation system 101 is mounted and used in the vehicle so that the detected axis 60 does not get out of the plane including the first and second detection axes 11 and 21 even if the mounting angle of the gyro sensor module 100 or the like changes.

Specifically, the mounting angle θ that the navigation system 101 forms with the horizontal ground surface 70 changes relative to the traveling azimuth of the vehicle due to an upward or downward slope of a road surface. Therefore, the navigation system 101 is disposed so that the plane including the first and second detection axes 11 and 21 is parallel with the traveling azimuth of the vehicle. In FIG. 3, the vehicle moves toward the right or left side of the paper surface.

Also, the navigation system 101 is disposed in the vehicle so that the detected axis 60 is located between the first and second detection axes 11 and 21 even if the angles $\theta_{22}$ and $\theta_{23}$ change. Since a road has upward slopes and downward slopes by the same number, the navigation system 101 is preferably mounted so that the angles $\theta_{22}$ and $\theta_{23}$ are equal with the vehicle being horizontal.

In this embodiment, the navigation system 101 is preferably mounted in the vehicle in a manner that the bottom 41 of the package 40 shown in FIG. 2 is inclined so that the angle $\theta_{22}$ and the angle $\theta_{23}$ are equal relative to the horizontal ground surface 70 with the vehicle being horizontal.

If the navigation system 101 is not mounted in a manner that the bottom of the package 40 is inclined toward the horizontal vehicle, the second detection axis 21 may also be inclined toward the bottom 41 in FIG. 2, provided that the first and second detected axes 11 and 21 form the acute angle $\theta_{12}$. Specifically, the gyro sensor 20 may be disposed on a slope of a base similar to the base 91 and the angle that the second detection axis 21 forms with the bottom 41 may be adjusted.

As described above, the inclinations of the first and second detection axes 11 and 21 toward the bottom 41 are adjusted in accordance with the angle at which the package 40 is mounted in the vehicle.

A first angular velocity ω1 around the first detection axis 11 is measured on the first detection axis 11, and a second angular velocity ω2 around the second detection axis 21 is measured on the second detection axis 21.

Figure 4:
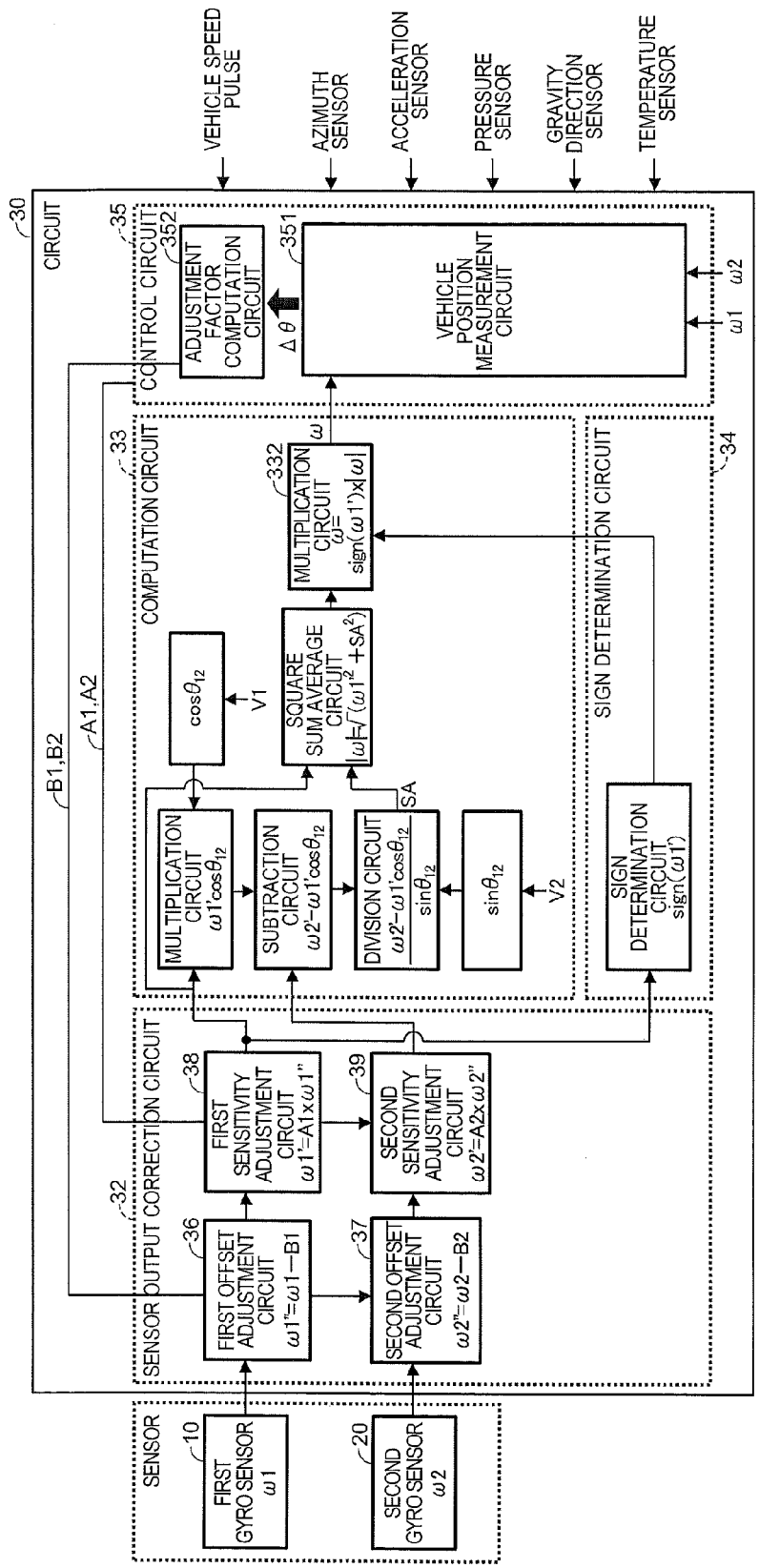
FIG. 4 is a block diagram of signal processing to be performed by a circuit.

FIG. 4 is a block diagram of signal processing to be performed by the circuit 30. In FIG. 4, the circuit 30 includes a sensor output correction circuit 32, a computation circuit 33, a sign determination circuit 34, and a control circuit 35.

The first angular velocity ω1 is detected in the first gyro sensor 10 and the second angular velocity ω2 is detected in the second gyro sensor 20. Signals representing the detected velocities are transmitted to the sensor output correction circuit 32. The sensor output correction circuit 32 includes a first offset adjustment circuit 36, a second offset adjustment circuit 37, a first sensitivity adjustment circuit 38, and a second sensitivity adjustment circuit 39.

The first offset adjustment circuit 36 obtains a value ω1″ by subtracting an output value B1 of the first gyro sensor 10 in a state in which the vehicle 102 is stopping, from the detected first angular velocity ω1, and outputs the value ω1″.

The second offset adjustment circuit 37 obtains a value ω2" by subtracting an output value B2 of the second gyro sensor 20 in a state in which the vehicle 102 is stopping, from the detected second angular velocity ω2, and outputs the value ω2".

The first sensitivity adjustment circuit 38 obtains a value ω1' by multiplying the ω1" by a sensitivity adjustment signal A1, and outputs the value ω1'. The second sensitivity adjustment circuit 39 obtains a value ω2' by multiplying the ω2" by a sensitivity adjustment signal A2, and outputs the value ω2'. The output values B1 and B2 and the sensitivity adjustment signals A1 and A2 are previously outputted from the control circuit 35. Signals representing the ω1' and ω2' are transmitted to the computation circuit 33. The signal representing the ω1' is also transmitted to the sign determination circuit 34.

The computation circuit 33 includes a circuit for obtaining an SA represented by the equation below, a square sum average circuit, and a multiplication circuit 332.

$$SA = (\omega2' - \omega1' \cos\theta_{12})/\sin\theta_{12}$$

First, as a step of obtaining the SA, the acute angle $\theta_{12}$ between the first and second detection axes 11 and 21 is converted into a signal representing $\cos\theta_{12}$ by inputting a voltage V1 corresponding to the acute angle $\theta_{12}$ into a cosine computation circuit. This is because the acute angle $\theta_{12}$ is determined according to the disposition of the first gyro sensor 10 and that of the second gyro sensor 20. Similarly, the acute angle $\theta_{12}$ is converted into a signal representing $\sin\theta_{12}$ by inputting a voltage V2 corresponding to the acute angle $\theta_{12}$ into a sine computation circuit.

Then, the multiplication circuit converts the analog signal representing ω1' and the signal representing $\cos\theta_{12}$ into a signal representing $\omega1' \cos\theta_{12}$.

Then, a subtraction circuit converts the analog signal representing ω2' and the signal representing $\omega1' \cos\theta_{12}$ into a signal representing $\omega2' - \omega1' \cos\theta_{12}$.

Then, a division circuit converts the signal representing $\omega2' - \omega1' \cos\theta_{12}$ and the signal representing $\sin\theta_{12}$ converted in the sine computation circuit, into a signal representing $(\omega2' - \omega1' \cos\theta_{12})/\sin\theta_{12}$. The obtained signal serves as a signal representing the SA.

Then, the signal representing ω1' and the signal representing SA are transmitted to the square sum average circuit so as to obtain a square sum average $\sqrt{(\omega1'^2 + SA^2)}$. Then, the obtained square sum average $\sqrt{(\omega1'^2 + SA^2)}$ is outputted as $|\omega|$ therefrom.

On the other hand, the sign determination circuit 34 obtains a value sign (ω1') from the ω1' and determines whether the sign (ω1') is positive or negative. If the sign (ω1') is positive, the sign determination circuit 34 outputs cω. This indicates that an angular velocity ω to be inputted is a clockwise rotation toward the arrow direction shown in FIG. 3. If the sign (ω1') is negative, the sign determination circuit 34 outputs ccω. This indicates that an angular velocity ω to be inputted is a counterclockwise rotation toward the arrow direction shown in FIG. 3.

The computation circuit 33 obtains an angular velocity value ω by adding a positive or negative sign to what is obtained by multiplying the output of the sign determination circuit 34 by |ω| using a multiplication circuit 332, and outputs a signal representing the angular velocity value ω.

The control circuit 35 includes a vehicle position measurement circuit 351 and an adjustment factor computation circuit 352. The vehicle position measurement circuit 351 outputs an error Δθ between a traveling azimuth obtained by integrating the angular velocity ω and the traveling azimuth θ of the vehicle 102 computed by the navigation system 101. Then, the adjustment factor computation circuit 352 computes sensitivity adjustment signals A1 and A2 from the error Δθ, the angular velocity ω outputted from the computation circuit 33, and a vehicle speed pulse outputted from the vehicle 102, and outputs the computed sensitivity adjustment signals A1 and A2 to the first and second sensitivity adjustment circuits 38 and 39. The sensitivity adjustment signals A1 and A2 may always be equal. These signals may be computed by the following equation.

$$A1 = A2 = 1 + \Delta\theta/\theta = 1 + (\theta\omega - \theta)/\theta$$

where θω is a value obtained by integrating the angular velocity ω outputted by the multiplication circuit 332 while the traveling azimuth of the vehicle 102 changes from 0 to θ. The θω is determined by the following equation.

$$\theta\omega = \int \omega dt$$

Also, the adjustment factor computation circuit 352 outputs the output value B1 of the first gyro sensor 10 and the output value B2 of the second gyro sensor 20 at a time when the vehicle 102 is stopping, to the first and second offset adjustment circuits 36 and 37, respectively.

The control circuit 35 determines whether or not the vehicle is stopping, according to the vehicle speed pulse. Alternatively, an offset adjustment may be made, for example, using, as a trigger, the startup of the navigation system 101 or the change of the ignition key from the "off" position to the "accessory-on" or "ignition-on" position.

Incidentally, it is sufficient that the first and second sensitivity circuits 38 and 39 are located after the first and second offset adjustment circuits 36 and 37, respectively. For example, these sensitivity circuits may be located after the square sum average circuit or the multiplication circuit 332. Also, changes in adjustment amount due to changes in temperature change may previously be stored so that an offset adjustment is automatically made by a temperature sensor. Further, a sensitivity adjustment may be made by detecting a deviation from the map due to the inclination of the vehicle 102 toward the pitch direction using a gravity direction sensor or an acceleration sensor.

The advantages of this embodiment will be described below.

(1) The first and second angular velocities ω1 and ω2 are converted into the first and second angular velocities ω1" and ω2" by the first and second offset adjustment circuits 36 and 37 included in the sensor output correction circuit 32 by subtracting the output value B1 of the first gyro sensor 10 and the output value B2 of the second gyro sensor 20 at a time when the vehicle is stopping, from the first and second angular velocities ω1 and ω2. Thus, the more accurate first and second angular velocities ω1" and ω2" at a time when the vehicle 102 is moving are obtained.

Further, the first and second detection axes 11 and 21 forms the acute angle $\theta_{12}$ and the angular velocity is detected in the acute angle $\theta_{12}$. This reduces the angle formed by the detection axes and the detected axis 60, allowing the gyro sensor 100 having a high detection accuracy to be obtained.

(2) The sensitivity adjustment signals A1 and A2 are computed from the error Δθ between the traveling azimuth obtained by integrating the angular velocity ω and the traveling azimuth computed by the navigation system 101, the angular velocity ω, and the vehicle speed pulse. Then, sensitivity adjustments are made by multiplying the ω1" and ω2" by the sensitivity adjustment signals A1 and A2. Thus, the ω1' and ω2' are outputted from the sensor output correction circuits 32. As a result, the gyro sensor module 100 and the angular velocity detection method for detecting the angular velocity more accurately are obtained.

(3) It is sufficient that the first gyro sensor 10 has the first detection axis 11 and the second gyro sensor 20 has the second detection axis 21. Therefore, the structures of these gyro sensors are made simpler than that of a gyro sensor having two detection axes.

(4) The angular velocity ω is outputted by the computation circuit 33. This allows the circuit 30 to be mounted into the gyro sensor module 100.

Second Embodiment

Figure 5:
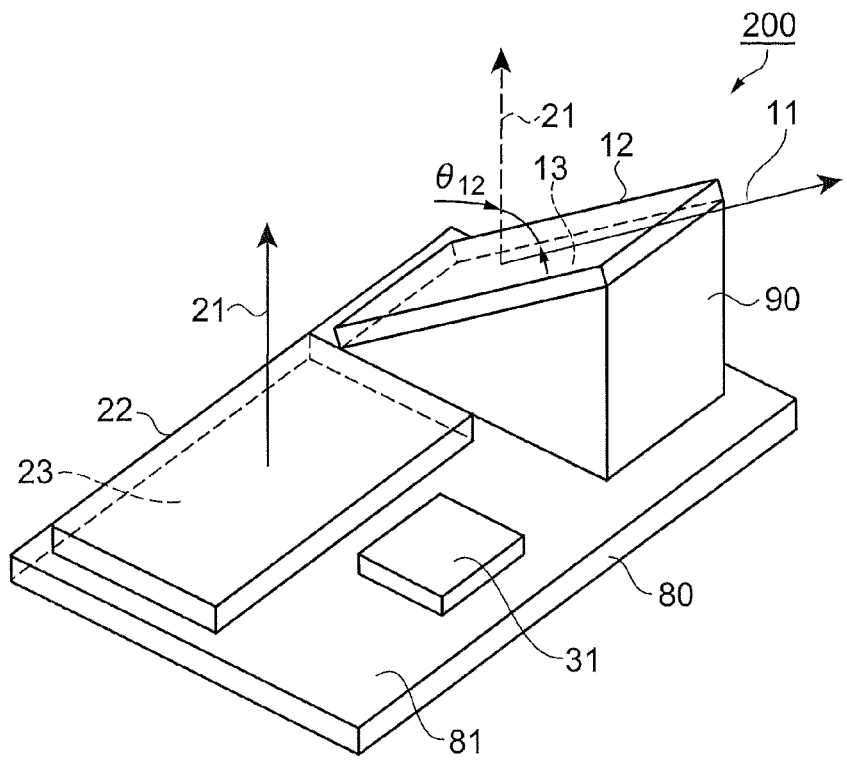
FIG. 5 is a schematic perspective view showing a gyro sensor module according to a second embodiment of the invention.

FIG. 5 is a schematic perspective view showing a gyro sensor module 200 according to a second embodiment of the invention. The gyro sensor module 200 includes a first gyro sensor module 12, a second gyro sensor module 22, and a base 80 having a rectangular mounting surface 81.

In the first gyro sensor 12, a tuning fork-shaped vibrator is mounted in a package having a rectangular mounting surface 13. A first detection axis 11 of the first gyro sensor 12 is mounted on the mounting surface 13 so as to be a longitudinal edge of the mounting surface 13. The first gyro sensor 12 is disposed on a slope of a base 90 disposed on the mounting surface 81. Therefore, the first detection axis is inclined toward the mounting surface 81.

In the second gyro sensor 22, a double T-shaped vibrator that is a combination of two T-shaped vibrators is mounted in a package having a rectangular mounting surface 23. The double T-shaped vibrator is mounted so that a second detection axis 21 thereof is orthogonal to the mounting surface 23. The second gyro sensor 22 is mounted on the base 80 so that the mounting surface 23 is parallel with the mounting surface 81. Since the first detection axis 11 is inclined toward the mounting surface 81, the angle formed by the first detection axis 11 and the second detection axis 21 is the acute angle $\theta_{12}$ (the direction of the second detection axis 21 is shown on an extension of the first detection axis 11 using a dotted line in the drawing).

As with the first embodiment, as long as the angle $\theta_{12}$ formed by the first and second detection axes 11 and 12 is an acute angle, the first and second gyro sensors 12 and 22 disposed on the mounting surface 81 may have any positional relation. A circuit similar to that according to the first embodiment may be used as a circuit 31.

Besides the advantages of the first embodiment, this embodiment has the following advantage.

(5) The gyro sensor module 200 is easily configured by combining the first and second gyro sensors 12 and 22 and the circuit 31, which are all already mounted.

Third Embodiment

Figure 6:
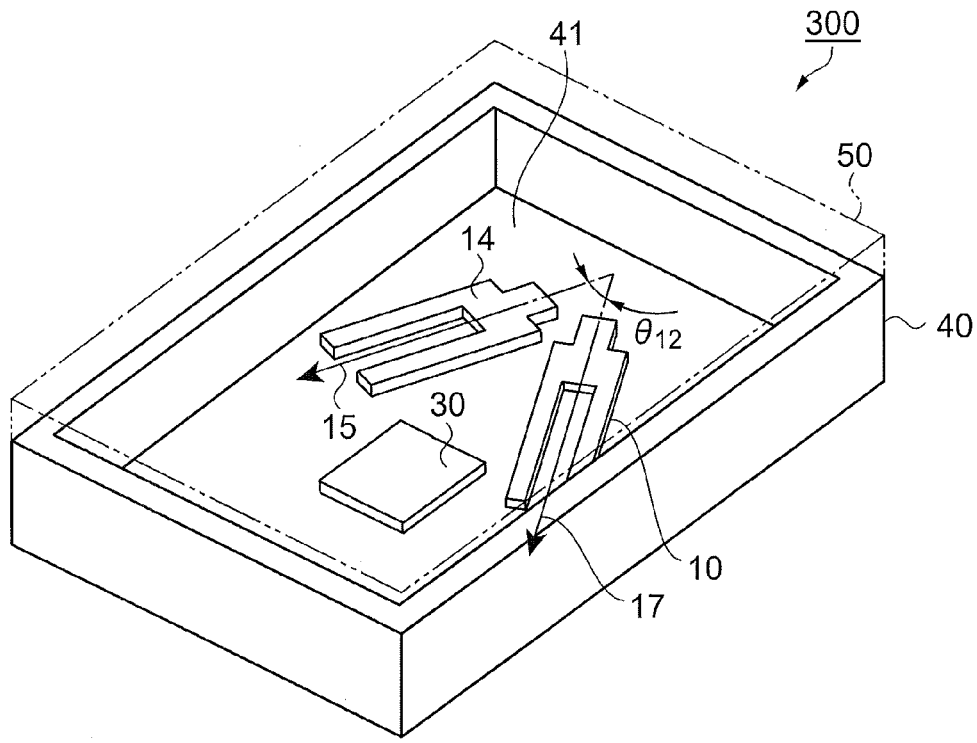
FIG. 6 is a schematic perspective view showing a gyro sensor module according to a third embodiment of the invention.

FIG. 6 is a schematic perspective view showing a gyro sensor module 300 according to a third embodiment of the invention. In FIG. 6, the gyro sensor module 300 includes the first gyro sensor 10, a second gyro sensor 14, the circuit 30, the box-shaped package 40, and the lid 50. The first gyro sensor 10, the second gyro sensor 14, and the circuit 30 are disposed on a rectangular bottom 41 of the package 40.

The first and second gyro sensors 10 and 14 are tuning fork-shaped gyro sensors and are disposed so that the angle $\theta_{12}$ formed by a first detection axis 17 of the first gyro sensor 10 and a second detection axis 15 of the second gyro sensor 14 is an acute angle.

The gyro sensor module 300 is mounted into a vehicle or the like so that a plane including the first detection axis 17 and the second detection axis 15 is orthogonal to the horizontal ground surface 70 as shown in FIG. 3.

Specifically, the gyro sensor module 300 is mounted so that the bottom 41 is orthogonal to the horizontal ground surface 70. As with the first embodiment, if the gyro sensor module 300 is mounted into a vehicle, it is mounted so that the bottom 41 is parallel with the traveling direction of the vehicle, and used. Also, as with the first embodiment, the gyro sensor module 300 is preferably mounted into the vehicle so that the $\theta_{22}$ and $\theta_{23}$ shown in FIG. 3 each form an identical angle with the horizontal ground surface 70 with the vehicle being horizontal.

This embodiment has the following advantage.

(6) The gyro sensor module 300 need not use the base 91 shown in the first embodiment, in the package 40. This allows the gyro sensor module 300 to be slimmed.

Fourth Embodiment

Figure 7:
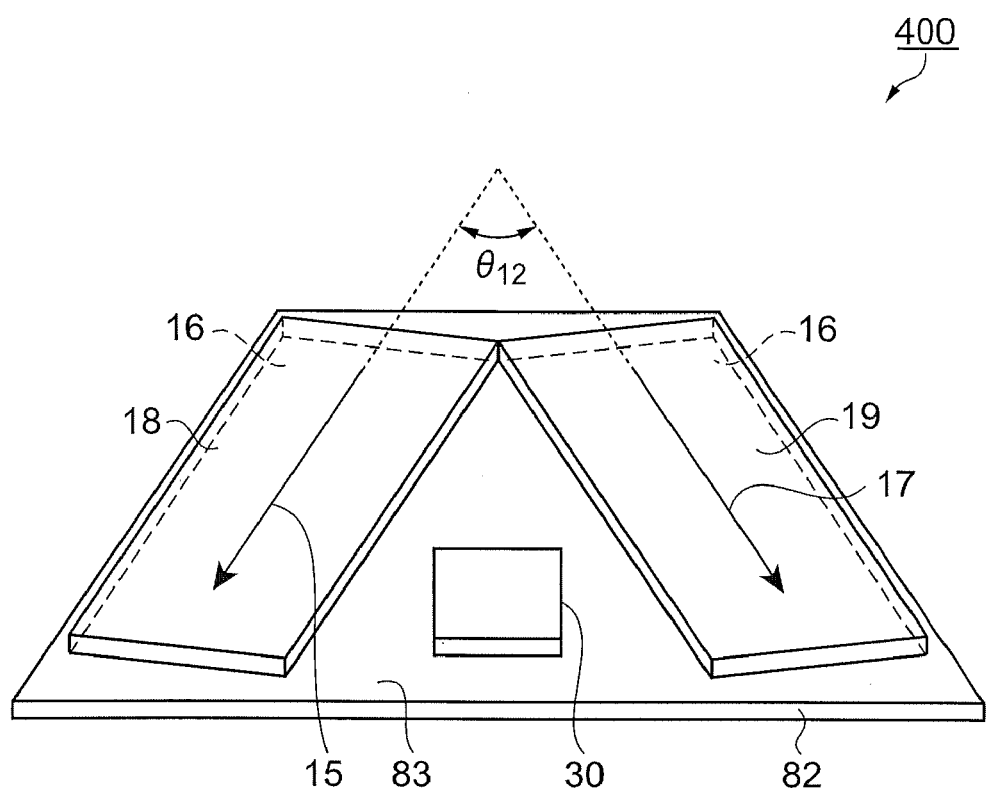
FIG. 7 is a schematic perspective view showing a gyro sensor module according to a fourth embodiment of the invention.

FIG. 7 is a schematic perspective view showing a gyro sensor module 400 according to a fourth embodiment of the invention. The gyro sensor module 400 includes a first gyro sensor 19, a second gyro sensor 18, the circuit 30, and a base 82 having a rectangular mounting surface 83.

In each of the first and second gyro sensors 19 and 18, a tuning fork-shaped vibrator is mounted in a package having a rectangular mounting surface 16. The first detection axis 17 of the first gyro sensor 19 and the second detection axis 15 of the second gyro sensor 18 are each packaged so as to be parallel with a longitudinal edge of the mounting surface 16. The first detection axis 17 and the second detection axis 15 are disposed so that the angle $\theta_{12}$ formed by these detection axes is an acute angle.

As with the third embodiment, the gyro sensor module 400 is preferably mounted into a vehicle so that the angles $\theta_{22}$ and $\theta_{23}$ shown in FIG. 3 each form an identical angle with the horizontal ground surface 70 with the vehicle being horizontal. A circuit similar to that according to the first embodiment may be used as the circuit 30.

Besides the advantage of the second embodiment, this embodiment obtains the advantage of the third embodiment.

Fifth Embodiment

Figure 8:
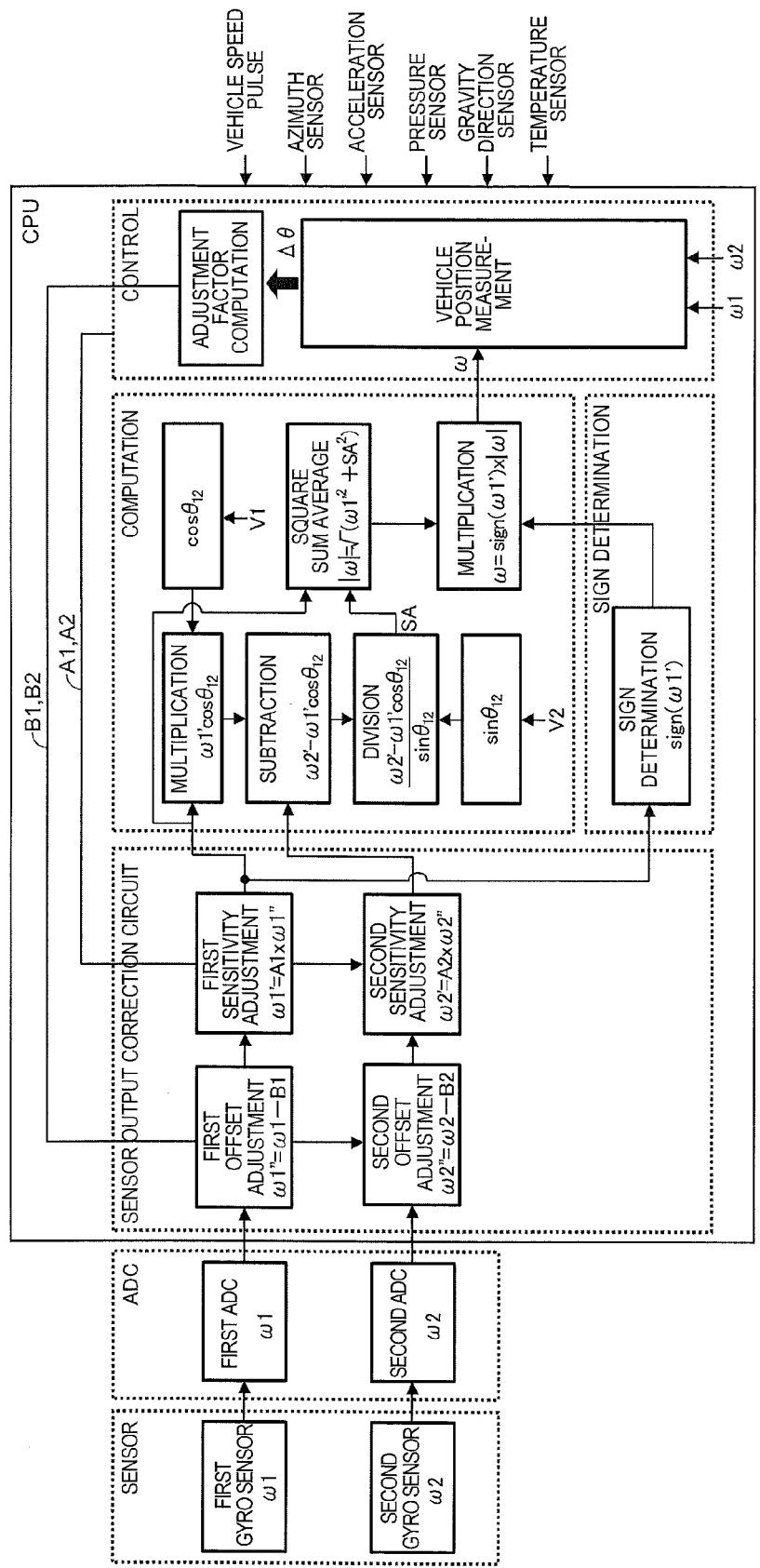
FIG. 8 is a block diagram of signal processing using software according to a fifth embodiment of the invention.

FIG. 8 is a block diagram of signal processing using software. In a fifth embodiment of the invention, an angular velocity is computed using the gyro sensor 100, 200, 300, or 400 according to the above-mentioned embodiments that includes none of the circuits 30 and 31.

The analog signals representing the first and second angular velocities ω1 and ω2 detected by the first gyro sensor 10, 12, or 19 and the second gyro sensor 20, 14, 18, or 22 are converted into digital signals by an analog digital converter (ADC). The ADC may be provided in the gyro sensor 100, 200, 300, or 400 or may be provided in a device including the gyro sensor 100, 200, 300, or 400, for example, in the navigation system 101. Sensor output corrections, a square sum average computation, a multiplication, a sign determination, an adjustment factor computation, and a vehicle position measurement are performed by processing the converted digital signals by a central processing unit (CPU) using the software. Thus, the angular velocity ω is detected.

One or more of the sensor output corrections, the square sum average computation, the multiplication, the sign determination, the adjustment factor computation, and the vehicle position measurement may be performed using the software.

In this case, an ADC is provided before performing such processing using the software.

This embodiment has the following advantage.

(7) One or more of the sensor output corrections, the angular velocity ω computation, the error Δθ computation, and the sensitivity adjustment signals A1 and A2 computations are performed using the software. Therefore, such processing is performed by the CPU of the navigation system 101 including the gyro sensor module 100, 200, 300, or 400. This allows downsizing of the gyro sensor modules 100, 200, 300, and 400.

The gyro sensor modules and the angular velocity detection method according to the invention may be used in a motorcycle as a vehicle. A case in which these modules and the angular velocity detection method are used in a motorcycle will now be described with reference to FIG. 2.

For use in a motorcycle, the gyro sensor module 100, 200, 300, or 400 is mounted on the motorcycle so that a plane including the first detection axis 11 and the second detection axis 21 is orthogonal to the traveling direction of the motorcycle.

The motorcycle is inclined bank angles $\theta_{22}$ and $\theta_{23}$ toward the horizontal ground surface 70 and makes a turn. Mounting the gyro sensor module 100, 200, 300, or 400 on the motorcycle so that the plane including the first detection axis 11 and the second detection axis 21 is orthogonal to the traveling direction of the motorcycle allows the angular velocity ω' to be obtained from a synthesis of the first and second angular velocities ω1' and ω2' according to the following equations even if the bank angles $\theta_{22}$ and $\theta_{23}$ vary.

$$\omega' = \sqrt{(\omega1'^2 + SA^2)}$$

$$SA = (\omega2' - \omega1' \cos\theta_{12})/\sin\theta_{12}$$

As for a portable navigation system that is detachable from a vehicle, its mounting angle changes each time it is re-mounted in the vehicle. Therefore, the gyro sensor modules and the angular velocity detection method according to the invention are effectively used in such a navigation system.

The invention is not limited to the above-mentioned embodiments and changes and modifications thereto fall within the invention as long as the advantages of the invention are achieved.

For example, one gyro sensor may have a first detection axis and a second detection axis so that a first angular velocity and a second angular velocity are detected in the gyro sensor.

The entire disclosure of Japanese Patent Application No. 2007-25138, filed Feb. 5, 2007 is expressly incorporated by reference herein.

What is claimed is:

1. A gyro sensor module built into a navigation system mounted into a mobile unit, comprising:
   a first gyro sensor detecting and outputting a first angular velocity ω1 around a first detection axis;
   a sign determination circuit for determining a sign of the first angular velocity ω1;
   a second gyro sensor detecting and outputting a second angular velocity ω2 around a second detection axis intersecting the first detection axis at an acute angle $\theta_{12}$;
   a sensor output correction circuit for correcting outputs of the first and second gyro sensors; and
   a computation circuit for computing ω' by equations $\omega' = \sqrt{(\omega1'^2 + SA^2)}$ and $SA = (\omega2' - \omega1' \cos\theta_{12})/\sin\theta_{12}$ using a first angular velocity ω1' and a second angular velocity ω2' obtained from corrections performed by the sensor output correction circuit, and outputting an angular velocity ω obtained by multiplying the ω' by the sign of the first angular velocity ω1 obtained by the sign determination circuit, wherein the sensor output correction circuit includes:
   a first offset adjustment circuit for outputting a value ω1″ obtained by subtracting, from the ω1, a correction value B1 corresponding to an output value of the first gyro sensor at a time when the mobile unit in which the gyro sensor module is disposed is stopping; and
   a second offset adjustment circuit for outputting a value ω2″ obtained by subtracting, from the ω2, a correction value B2 corresponding to an output value of the second gyro sensor at a time when the mobile unit in which the gyro sensor module is disposed is stopping, and the angular velocity ω is an angular velocity around an axis located in a plane including the first and second detection axes and in a range between the first and second detection axes.

2. The gyro sensor module according to claim 1, further comprising:
   a vehicle position measurement circuit for outputting an error Δθ between a traveling azimuth obtained by integrating the angular velocity ω outputted from the computation circuit and a traveling azimuth of the mobile unit computed by the navigation system; and
   an adjustment factor computation circuit for computing and outputting sensitivity adjustment signals A1 and A2 from the error Δθ, the angular velocity ω outputted from the computation circuit, and a vehicle speed pulse outputted from the mobile unit, wherein the sensor output correction circuit includes:
   a first sensitivity adjustment circuit for outputting an value ω1' obtained by multiplying the ω1″ outputted from the first offset adjustment circuit by the sensitivity adjustment signal A1; and
   a second sensitivity adjustment circuit for outputting a value ω2' obtained by multiplying the ω2″ outputted from the second offset adjustment circuit by the sensitivity adjustment signal A2.

3. A method for detecting an angular velocity using a gyro sensor module built into a navigation system mounted into a mobile unit, comprising:
   detecting a first angular velocity ω1 around a first detection axis;
   determining a sign of the first angular velocity ω1;
   detecting a second angular velocity ω2 around a second detection axis intersecting the first detection axis at an acute angle $\theta_{12}$;
   performing sensor output corrections including a first offset adjustment in which a correction value B1 corresponding to an output value of a first gyro sensor at a time when the mobile unit in which the gyro sensor module is disposed is stopping is subtracted from the ω1 and a second offset adjustment in which a correction value B2 corresponding to an output value of a second gyro sensor at a time when the mobile unit in which the gyro sensor module is disposed is stopping is subtracted from the ω2; and
   computing an angular velocity ω by computing ω' by equations $\omega' = \sqrt{(\omega1'^2 + SA^2)}$ and $SA = (\omega2' - \omega1' \cos\theta_{12})/\sin\theta_{12}$ using a first angular velocity ω1' and a second angular velocity ω2' obtained from the sensor output corrections and then by multiplying the ω' by the sign of the first angular velocity ω1 obtained by a sign determination circuit, wherein the angular velocity $\omega$ is an angular velocity around an axis located in a plane including the first and second detection axes and in a range between the first and second detection axes.

4. The method for detecting an angular velocity according to claim 3, further comprising:

computing an error $\Delta\theta$ between a traveling azimuth obtained by integrating the angular velocity $\omega$ and a traveling azimuth of the mobile unit computed by the navigation system; and computing sensitivity adjustment signals A1 and A2 from the error $\Delta\theta$ and the angular velocity $\omega$, wherein in the step of performing the sensor output corrections, a first sensitivity adjustment in which an value $\omega 1'$ is computed by multiplying a value $\omega 1''$ after the first offset adjustment by the sensitivity adjustment signal A1 and a second sensitivity adjustment in which an value $\omega 2'$ is computed by multiplying a value $\omega 2''$ after the second offset adjustment by the sensitivity adjustment signal A2 are performed.

5. The method for detecting an angular velocity according to claim 3, wherein the sensor output corrections performing step is performed by a sensor output correction circuit.

6. The method for detecting an angular velocity according to claim 3, wherein one or more of the sensor output corrections, the angular velocity $\omega$ computation, the error $\Delta\theta$ computation, and the sensitivity adjustment signals A1 and A2 computations are performed using software.

* * * * *